United States Patent Office 2,992,160
Patented July 11, 1961

2,992,160
α-ETHYNYLBENZYL ALCOHOLS FOR AGRICULTURAL CONTROL OF FUNGI
Alan J. Lemin, Richland Township, Kalamazoo County, Mich., and George R. Pettit, Orono, Maine, assignors to The Upjohn Company, Kalamazoo, Mich., a corporation of Delaware
No Drawing. Filed May 31, 1960, Ser. No. 32,517
10 Claims. (Cl. 167—38)

This invention relates to a method of controlling the growth of fungi and to novel compositions useful therein, and is more particularly directed to the use of α-ethynylbenzyl alcohol and derivatives thereof for the control of fungi.

We have found that the compounds represented by the formula:

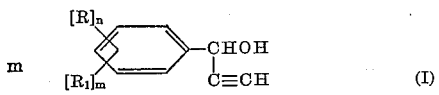

(I)

wherein R represents halogen, $R_1$ represents lower-alkyl, and $n$ and $m$ represent whole numbers from 0 to 3, inclusive, and the sum of $m+n$ is a whole number from 0 to 3, inclusive, are effective in the control of seed-borne and soil-borne fungi, especially those of the Rhizoctonia, Pythia, Sclerotinia, Phytopthora, Collelotrichia, Sclerotia, and Fusaria genera, for example, *Rhizoctonia solani, Pythium debaryanum, Pythium ultimum, Sclerotinia sclerotiorum, Phytopthora cactorum, Collelotrichum lindemuthianum, Sclerotium rolfsii,* and *Fusarium culmorum*. Seeds which are planted in soil infected with such organisms are attacked by the latter. In many instances germination of the seeds is prevented entirely and, even where germination occurs, the resulting seedlings often do not develop into healthy plants. Frequently seeds such as those of cotton, peas, corn, wheat, and beans become infected by the fungi during harvesting or during storage and such seeds, when planted in soil which itself is not infected, fail to germinate or give rise to seedlings which do not develop into healthy plants.

We have found that seeds, which have been or are liable to become infected with fungi before planting or which are to be planted in soil infected with fungi, can be protected from attack by said fungi by application of a fungicidally effective amount of a compound having the Formula I to the seeds before planting. We have also found that soil which is infected with fungi can be treated with a fungicidally effective amount of a compound having the Formula I and the soil so treated can be used to grow plants from seeds which in the untreated soil would have failed to germinate or would have given rise to infected plants.

Accordingly, the process of the invention comprises a method for the control of fungal infestations of seed and of soil which comprises applying to the locus to be treated a fungicidally effective amount of a compound having the Formula I.

In the above definition of the group $R_1$ in the compound having the Formula I the term "lower-alkyl" means an alkyl radical containing from 1 to 6 carbon atoms, inclusive, such as methyl, ethyl, propyl, butyl, amyl, hexyl, and isomeric forms thereof. The term "halogen" employed in the definition of R includes fluorine, chlorine, bromine, and iodine.

A number of the compounds having the Formula I above are known compounds and all the compounds having the Formula I can be prepared readily using methods well-known in the art.

Illustratively, the compounds having the Formula I can be prepared by reacting sodium acetylide with the appropriate aldehyde having the formula:

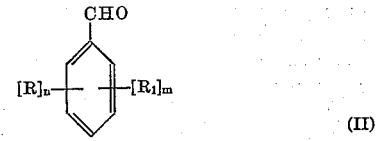

(II)

wherein R, $R_1$, $n$, and $m$ have the significance hereinbefore defined, in the presence of liquid ammonia using the procedure described by Campbell et al., J. Am. Chem. Soc. 60, 2882 (1938), for the preparation of α-ethnylbenzyl alcohol from sodium acetylide and benzaldehyde.

Illustrative of the compounds having the Formula I are the following: α-ethnylbenzyl alcohol, α-ethnyl-2-methylbenzyl alcohol, α-ethynyl-3-methylbenzyl alcohol, α-ethynyl-4-methylbenzyl alcohol, 4-ethyl-α-ethynylbenzyl alcohol, α-ethynyl-3-isopropylbenzyl alcohol, 4-tert.-butyl-α-ethynylbenzyl alcohol, 4-tert.-amyl-α-ethynylbenzyl alcohol, α-ethynyl-4-hexylbenzyl alcohol, 2,4-dimethyl-α-ethynylbenzyl alcohol, 3,4-dimethyl-α-ethynylbenzyl alcohol, α-ethynyl-2,4,5-trimethylbenzyl alcohol, α-ethynyl-2,4,6-trimethylbenzyl alcohol, α-ethynyl-2,3,5-trimethylbenzyl alcohol, α-ethynyl-2-isopropyl-5-methylbenzyl alcohol, α-ethynyl-2-fluorobenzyl alcohol, α-ethynyl-3-fluorobenzyl alcohol, α-ethynyl-4-fluorobenzyl alcohol, 2-chloro-α-ethynylbenzyl alcohol, 3-chloro-α-ethynylbenzyl alcohol, 4-chloro-α-ethynylbenzyl alcohol, 2-bromo-α-ethynylbenzyl alcohol, 3-bromo-α-ethynylbenzyl alcohol, 4-bromo-α-ethynylbenzyl alcohol, α-ethynyl-2-iodobenzyl alcohol, α-ethynyl-3-iodobenzyl alcohol, α-ethynyl-4-iodobenzyl alcohol, 3,4-dichloro-α-ethynylbenzyl alcohol, 2,4-dichloro-α-ethynylbenzyl alcohol, 3,5-dichloro-α-ethynylbenzyl alcohol, 2,6-dibromo-α-ethynylbenzyl alcohol, 3,4-dibromo-α-ethynylbenzyl alcohol, 3-bromo-4-chloro-α-ethynylbenzyl alcohol, 4-chloro-3-iodo-α-ethynylbenzyl alcohol, 4-bromo-3-chloro-α-ethynylbenzyl alcohol, 4-bromo-3-iodo-α-ethynylbenzyl alcohol, 3-chloro-4-iodo-α-ethynylbenzyl alcohol, 3-bromo-4-iodo-α-ethynylbenzyl alcohol, 2-bromo-3,5-dichloro-α-ethynylbenzyl alcohol, 2-chloro-6-fluoro-α-ethynylbenzyl alcohol, 3,6-dichloro-2-iodo-α-ethynylbenzyl alcohol, α-ethynyl-2,3,5,-trichlorobenzyl alcohol, α-ethynyl-3,4,5-trichlorobenzyl alcohol, 2-chloro-4-methyl-α-ethynylbenzyl alcohol, 3-chloro-4-methyl-α-ethynylbenzyl alcohol, 2-bromo-6-methyl-α-ethynylbenzyl alcohol, 5-bromo-2,4-dimethyl-α-ethynylbenzyl alcohol, and 3,5-dimethyl-4-iodo-α-ethynylbenzyl alcohol.

The aldehydes having the Formula II which are employed as starting materials in the above process are for the most part known. They can be prepared by methods known in the art. Such methods are summarized in Chemistry of Carbon Compounds, edited by E. H. Rodd, volume IIIA, pages 506 to 511 (Elsevier, New York). Illustrative of the aldehydes having the Formula II are benzaldehyde, o-, m- and p-tolualdehyde, p-ethylbenzaldehyde, m-isopropylbenzaldehyde, p-tert.-butylbenzaldehyde, p-tert.-amylbenzaldehyde, p-hexylbenzaldehyde, 2,4-dimethylbenzaldehyde, 3,4-dimethylbenzaldehyde, 2,4,5-trimethylbenzaldehyde, 2,4,6-trimethylbenzaldehyde, 2,3,5 - trimethylbenzaldehyde, 2-isopropyl-5-methylbenzaldehyde, o-, m-, and p-fluorobenzaldehyde, o-, m-, and p-chlorobenzaldehyde, o-, m-, and p-bromobenzaldehyde, o-, m-, and p-iodobenzaldehyde, 3,4-dichlorobenzaldehyde 2,4-dichlorobenzaldehyde, 3,5-dichlorobenzaldehyde, 2,6-dibromobenzaldehyde, 3,4 - dibromobenzaldehyde, 3-bromo - 4 - chlorobenzaldehyde, 4-chloro-3-iodobenzaldehyde, 4 - bromo-3-chlorobenzaldehyde, 4-bromo-3-iodobenzaldehyde, 3 - chloro-4-iodobenzaldehyde, 3-bromo-4-iodobenzaldehyde, 2 - bromo-3,5-dichlorobenzaldehyde, 2-chloro-6-fluorobenzaldehyde, 3,6 - dichloro-2-iodobenzaldehyde, 2,3,5 - trichlorobenzaldehyde, 3,4,5 - trichlorobenzaldehyde, 2 - chloro-4-methylbenzaldehyde, 3-chloro-4-methylbenzaldehyde, 2 - bromo-6-methylbenzaldehyde, 5-bromo - 2,4-dimethylbenzaldehyde, and 3,5-dimethyl-4-iodobenzaldehyde.

In order to achieve effective control of fungi of the kind noted above by application of a compound having the Formula I to seeds which are themselves infected with fungi or which are to be planted in soil infected with said fungi, it is necessary to treat the seeds with a compound having the Formula I, advantageously using formulations such as those to be described hereinafter, at a rate of about 0.25 ounce to about 10 ounces of compound having the Formula I per bushel of seed. Preferably the amount of compound having the Formula I employed is about 1 ounce to about 2 ounches per bushel of seed.

In the treatment of soil according to the process of the invention, in order to obtain effective control of fungal infestations therein, it is necessary to apply to the soil, using formulations such as those to be described hereinafter, an amount of compound having the Formula I within the range of about 0.5 pound to about 20 pounds per acre. Preferably the amount of compound having the Formula I applied to the soil is within the range of about 2 pounds to about 6 pounds per acre.

The fungicidal compositions of the invention comprise dusts, dispersible powders, aqueous dispersions, emulsifiable concentrates, and oil-in-water emulsions in which a compound having the Formula I is present as the active fungicidal agent.

The fungicidal dusts of the invention comprise a compound having the Formula I dispersed in an inert dusting powder such as pyrophyllite, diatomite, clays such as bentonite, Georgia clay, Attapulgus clay, Barden clay, wood or walnut shell flour, and the like. Dusting powder is understood to be a solid material comminuted so that it has an average particle size of less than 50 microns, advantageously less than 15 microns.

Since the compounds having the Formula I are, in many cases, liquids at ordinary temperatures, the fungicidal dusts of the invention can be prepared more conveniently by adding to the solid diluent a solution of the compound in a volatile solvent such as ethanol, acetone, ether, and the like, mixing to form a paste, drying, and milling.

The amount of compound having the Formula I present in the dusting powders is advantageously of the order of about 1 percent to about 90 percent and is preferably of the order of about 5 percent to about 25 percent by weight. However, in the case of those compounds having the Formula I which are ordinarily oils the upper limit of concentration of compound in the dusting powders of the invention is lower and is generally of the order of 60 percent by weight.

The fungicidal dusts prepared as described above are particularly suitable for the treatment of seeds but can also be used in the treatment of soil. When so used in the treatment of soil, the fungicidal dusts of the invention can also include solid fertilizers in order that fertilization and treatment of the soil to control fungi can be accomplished in a single operation.

The dispersible powders of the invention comprise a compound having the Formula I, an inert dusting powder as hereinbefore defined, and a surfactant. As surfactant there can be used any of the conventional wetting and dispersing agents of the anionic, cationic, and nonionic types that are commonly employed in compositions for controlling fungal infections in horticulture and agriculture. Suitable surfactants having sufficient wetting and/or dispersing activity for the purposes of this invention include alkyl sulfates and sulfonates, alkylbenzenesulfonates, sulfosuccinate esters, polyoxyethylene sulfates, polyoxyethylene sorbitan monolaurate, alkylarylpolyether alcohols, alkylnaphthalenesulfonates, alkyl quaternary ammonium salts, sulfated fatty acid esters, sulfated fatty acid amides, glycerol mannitan laurate, polyalkyl ether condensates of fatty acids, and ligninsulfonates, the sulfates and sulfonates, of course, being used in the form of their soluble salts, for example, the sodium salts. All these surfactants are capable of reducing the surface tension of water to less than about 40 dynes per cm. in concentrations of about 1 percent or less.

The concentration of compound having the Formula I present in the dispersible powders is of the same order as in the dusts described above.

The aqueous dispersions of the invention comprise a compound having the Formula I, a surfactant, and water and can be prepared by diluting the above-described dispersible powders with water, or by dissolving a compound having the Formula I in a water-miscible solvent such as acetone, dimethylformamide, dimethyl sulfoxide, and the like, containing a surfactant, and pouring the resulting solution into water. The aqueous dispersions so obtained can be used in the treatment of seeds, the seeds being dried after treatment, or more suitably, can be employed in the treatment of soil for the control of fungal infestations. The concentration of compound having the Formula I which is present in the aqueous dispersions for the treatment of soil can be varied over a wide range to meet the needs of the spraying machine employed in the application thereof; advantageously, the concentration of compound having the Formula I in the aqueous dispersions falls within the range of about 500 p.p.m. and about 10,000 p.p.m. When the aqueous dispersions are employed for the treatment of seed, the concentration of compound having the Formula I is generally higher, and advantageously is of the order of 5 to 45 percent by weight.

The compositions of the invention also include emulsifiable concentrates and the oil-in-water emulsions obtained by pouring said concentrates into water. The emulsifiable concentrates comprise a compound having the Formula I in solution in a mixture of a surfactant and a water-immiscible solvent such as cyclohexanone, aromatic hydrocarbons, for example benzene, toluene, xylene, and the like, and high-boiling petroleum hydrocarbons such as kerosene, diesel oil, and the like. The concentration of compound having the Formula I in the emulsifiable concentrates is advantageously of the order of about 20 percent to about 80 percent by weight. The concentration of compound having the Formula I in the oil-in-water emulsions obtained by diluting the emulsifiable concentrates with water can be varied over a wide range to meet the needs of the spraying machine employed in the application thereof. Advantageously, the concentration of compound having the Formula I in the oil-in-water emulsions falls within the range of about 500 p.p.m. to about 10,000 p.p.m.

The oil-in-water emulsions of the invention are particularly suitable in the treatment of soil for the control of fungal infestations. Both the aqueous dispersions and the oil-in-water emulsions can be applied to soil using conventional spraying machines of the land-borne or air-borne type.

Advantageously, the oil-in-water emulsions and the aqueous dispersions are applied to the soil at the time at which the seeds are planted or shortly after the seeds have been planted. Thus the liquid formulations can be applied to the furrow in which the seeds are to be planted, the application of the liquid formulation and the planting of the seeds being accomplished in a continuous operation. Alternatively, after the seeds have been planted, the liquid formulations can be applied to the soil in a band on either side of the row in which the seeds have been planted. The liquid formulations of the invention can also be applied as soil drenches by methods known in the art.

The compositions of the invention also include compositions in which a compound having the Formula I is employed in combination with known fungicides. Such known fungicides include N-(trichloromethylthio)-1,2,3,6- tetrahydrophthalimide (Captan), 3-[2-(3,5-dimethyl-2-oxocyclohexyl)-2-hydroxyethyl]glutarimide (clcloheximide), 2,3-dichloro-1,4-naphthoquinone (dichlone), tetrachloro-p-benzoquinone (chloranil), pentachloronitrobenzene, ferric dimethyldithiocarbamate (Ferbam), disodium ethylenebis[dithiocarbamate] (Nabam), manganous ethylenebis[dithiocarbamate] (Maneb), zinc ethylenebis[dithiocarbamate] (Zineb), tetramethyl thiuram disulfide, etc.

The following examples are illustrative of the process and products of the present invention, but are not to be construed as limiting.

EXAMPLE 1

*Preparation of α-ethynyl-3-methylbenzyl alcohol*

Acetylene gas was washed by passage through concentrated sulfuric acid before being passed into 400 ml. of liquid ammonia contained in a 2 l. 3-neck flask fitted with mechanical stirrer, addition funnel, and solid carbon dioxide condenser. After the acetylene gas had been passing into the liquid ammonia for 5 minutes a total of 9.69 g. (0.33 mole) of metallic sodium was added slowly in small chunks at a rate slow enough to prevent a blue color appearing in the solution. The passage of acetylene gas was maintained throughout this period. After the addition was complete the mixture was stirred for 10 minutes. To the solution so obtained was added slowly over a period of 45 minutes a solution of 36.04 g. (0.3 mole) of m-tolualdehyde in 100 ml. of ether. The passage of acetylene gas was maintained throughout this operation and during the next 2 hr., during which time the mixture was stirred. The excess sodium in the mixture was then decomposed by the addition of 37.5 g. of ammonium chloride. The mixture so obtained was stirred and the ammonia was allowed to evaporate, the volume of the solution being maintained substantially constant by the addition of ether as required. When the mixture attained about 25° C. sufficient water was added to give a clear solution. The ethereal layer was then separated and washed successively with two 500-ml. portions of water, 500 ml. of dilute sulfuric acid, and two 500-ml. portions of water. The washed ethereal solution was then dried over anhydrous sodium sulfate. The dried solution was filtered and the filtrate was evaporated to dryness. The residue was distilled under reduced pressure and the fraction was collected which had a boiling point of 90 to 95° C. at a pressure of 0.5 mm. of mercury. There was thus obtained α-ethynyl-3-methylbenzyl alcohol in the form of an oil.

*Analysis.*—Calcd. for $C_{10}H_{10}O$: C, 82.16; H, 6.90. Found: C, 82.31; H, 6.70.

EXAMPLE 2

*Preparation of α-ethynyl-3,4-dichlorobenzyl alcohol*

Using the procedure described in Example 1, but substituting 3,4-dichlorobenzaldehyde for m-tolualdehyde, there was obtained α-ethynyl-3,4-dichlorobenzyl alcohol in the form of an oil having a boiling point of 108° C. at a pressure of 0.9 mm. of mercury.

EXAMPLE 3

*Preparation of α-ethynyl-3,4-dimethylbenzyl alcohol*

Using the procedure described in Example 1, but substituting 3,4-dimethylbenzaldehyde [Niedzielski et al., J. Am. Chem. Soc. 63, 1462 (1941)], for m-tolualdehyde, there was obtained α-ethynyl-3,4-dimethylbenzyl alcohol.

EXAMPLE 4

*Preparation of α-ethynyl-2,4,6-trimethylbenzyl alcohol*

Using the procedure described in Example 1, but substituting 2,4,6-trimethylbenzaldehyde [Niedzielski et al., J. Org. Chem. 8, 147 (1943)], for m-tolualdehyde, there was obtained α-ethynyl-2,4,6-trimethylbenzyl alcohol.

EXAMPLE 5

*Preparation of α-ethynyl-3-isopropylbenzyl alcohol*

Using the procedure described in Example 1, but substituting m-isopropylbenzaldehyde [Gilman et al., J. Am. Chem. Soc. 57, 909 (1935)], for m-tolualdehyde, there was obtained α-ethynyl-3-isopropylbenzyl alcohol.

EXAMPLE 6

*Preparation of α-ethynyl-4-bromobenzyl alcohol*

Using the procedure described in Example 1, but substituting p-bromobenzaldehyde [Wuyts et al., Bull. soc. chim. Belg. 40, 665 (1931)], for m-tolualdehyde, there was obtained α-ethynyl-4-bromobenzyl alcohol.

EXAMPLE 7

*Preparation of α-ethynyl-4-fluorozenyl alcohol*

Using the procedure described in Example 1, but substituting p-fluorobenzaldehyde [Shoesmith et al., J. Chem. Soc. 1926, 2760], for m-tolualdehyde, there was obtained α-ethynyl-4-fluorobenzyl alcohol.

EXAMPLE 8

*Preparation of α-ethynyl-3,4,5-trichlorobenzyl alcohol*

Using the procedure described in Example 1, but substituting 3,4,5-trichlorobenzaldehyde [Van de Bunt, Rec. trav. chim. 48, 121 (1929)], for m-tolualdehyde, there was obtained α-ethynyl-3,4,5-trichlorobenzyl alcohol.

EXAMPLE 9

*Preparation of α-ethynyl-3-chloro-4-bromobenzyl alcohol*

Using the procedure described in Example 1, but substituting 3-chloro-4-bromobenzaldehyde (Hodgson et al., J. Chem. Soc. 1927, 20), for m-tolualdehyde, there was obtained α-ethynyl-3-chloro-4-bromobenzyl alcohol.

EXAMPLE 10

*Emulsifiable concentrate*

An emulsifiable concentrate was prepared by dissolving 7 g. of α-ethynylbenzyl alcohol and 0.5 g. of Agrimul N4R (an alkylarylpolyether alcohol) in sufficient isopropyl alcohol to make 70 ml. of solution. The emulsifiable concentrate so obtained is suitable for dilution with water to form an emulsion which can be used in the treatment of seeds and/or soil.

The α-ethynylbenzyl alcohol employed in the above formulation can be replaced by any of the following compounds: α-ethynyl-4-methylbenzyl alcohol, α-ethynyl-3-methylbenzyl alcohol, 2-chloro-α-ethynylbenzyl alcohol, 4-chloro-α-ethynylbenzyl alcohol, 3,4-dichloro-α-ethynylbenzyl alcohol, 3,4-dimethyl-α-ethynylbenzyl alcohol, α-ethynyl-2,4,6-trimethylbenzyl alcohol, α-ethynyl-3-isopropylbenzyl alcohol, 4-bromo-α-ethynylbenzyl alcohol, α-ethynyl-4-fluorobenzyl alcohol, α-ethynyl-3,4,5-trichlorobenzyl alcohol, and 3-chloro-4-bromo-α-ethynylbenzyl alcohol.

EXAMPLE 11

*Dispersible powder*

A dispersible powder was prepared by mixing 145 g. of Microcel E (a proprietary calcium silicate), 150 g. of α-ethynylbenzyl alcohol, and 5 g. of Agrimul 70A (an alkylarylpolyether alcohol mixture). The dispersible powder so obtained can be diluted with the appropriate amount of water to form an aqueous dispersion or can be used in the solid state in the treatment of seeds and soil. Illustratively, 4 ounces of the above dispersible powder can be mixed with 2 gallons of water to form an aqueous dispersion containing 7500 p.p.m. of α-ethynylbenzyl alcohol, suitable for the treatment of soil. Alternatively the above dispersible powder can be used to treat (by rolling) cotton seeds, peas, corn seeds, wheat seeds, and beans, at the rate of 2 ounces of dispersible powder per bushel of seed.

The α-ethynylbenzyl alcohol employed in the above formulation can be replaced by any of the following compounds: α-ethynyl-4-methylbenzyl alcohol, α-ethynyl-3-methylbenzyl alcohol, 2-chloro-α-ethynylbenzyl alcohol, 4-chloro-α-ethynylbenzyl alcohol, 3,4-dichloro-α-ethynylbenzyl alcohol, 3,4-dimethyl-α-ethynylbenzyl alcohol, α-ethynyl-2,4,6-trimethylbenzyl alcohol, α-ethynyl-3-isopropylbenzyl alcohol, 4-bromo-α-ethynylbenzyl alcohol, α-ethynyl-4-fluorobenzyl alcohol, α-ethynyl-3,4,5-trichlorobenzyl alcohol, and 3-chloro-4-bromo-α-ethynylbenzyl alcohol.

We claim:

1. A process for the control of fungal infestations of seeds and of soil which comprises applying to the locus to be treated a fungicidally effective amount of a compound having the formula:

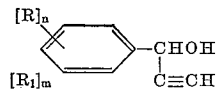

wherein R represents halogen, $R_1$ represents lower-alkyl, $n$ and $m$ represent whole numbers from 0 to 3, inclusive, and the sum of $m+n$ is a whole number from 0 to 3, inclusive.

2. A process according to claim 1 wherein the fungicidally effective compound is α-ethynylbenzyl alcohol.

3. A process for the control of fungal attack on seeds both before and after planting which comprises contacting the seeds with a fungicidally effective amount of a compound having the formula:

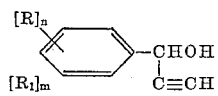

wherein R represent halogen, $R_1$ represents lower-alkyl, $n$ and $m$ represent whole numbers from 0 to 3, inclusive, and the sum of $m+n$ is a whole number from 0 to 3, inclusive.

4. A process for the control of fungal infestations of soil which comprises applying to the soil a fungicidally effective amount of a compound having the formula:

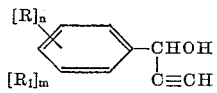

wherein R represent halogen, $R_1$ represents lower-alkyl, $n$ and $m$ represent whole numbers from 0 to 3, inclusive, and the sum of $m+n$ is a whole number from 0 to 3, inclusive.

5. A fungicidal composition which comprises a fungicidally effective amount of a compound having the formula:

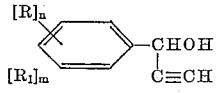

wherein R represents halogen, $R_1$ represents lower-alkyl, $n$ and $m$ represent whole numbers from 0 to 3, inclusive, and the sum of $m+n$ is a whole number from 0 to 3, inclusive, dispersed in a carrier consisting of water containing a surfactant.

6. A fungicidal composition in the form of an emulsifiable concentrate which comprises a surfactant, a water-immiscible solvent, and a fungicidally effective amount of a compound having the formula:

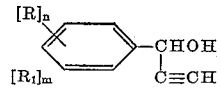

wherein R represents halogen, $R_1$ represents lower-alkyl, $n$ and $m$ represent whole numbers from 0 to 3, inclusive, and the sum of $m+n$ is a whole number from 0 to 3, inclusive.

7. A fungicidal composition in the form of a concentrate adapted to form an aqueous dispersion on dilution with water which comprises a surfactant, a water-miscible solvent, and a fungicidally effective amount of a compound having the formula:

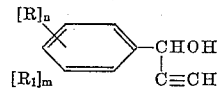

wherein R represents halogen, $R_1$ represents lower-alkyl, $n$ and $m$ represent whole numbers from 0 to 3, inclusive, and the sum of $m+n$ is a whole number from 0 to 3, inclusive.

8. A fungicidal composition in the form of a dispersible powder which comprises a surfactant, an inert solid diluent, and a fungicidally effective amount of a compound having the formula:

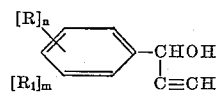

wherein R represents halogen, $R_1$ represents lower-alkyl, $n$ and $m$ represent whole numbers from 0 to 3, inclusive, and the sum of $m+n$ is a whole number from 0 to 3, inclusive.

9. A fungicidal composition in the form of a dusting powder which comprises an inert solid diluent and a fungicidally effective amount of a compound having the formula:

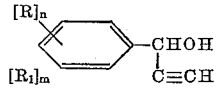

wherein R represents halogen, $R_1$ represents lower-alkyl, $n$ and $m$ represent whole numbers from 0 to 3, inclusive, and the sum of $m+n$ is a whole number from 0 to 3, inclusive.

10. A fungicidal composition in the form of an emulsifiable concentrate which comprises a surfactant, a water-immiscible solvent, and a fungicidally effective amount of α-ethynylbenzyl alcohol.

References Cited in the file of this patent

UNITED STATES PATENTS

| | | |
|---|---|---|
| 2,125,384 | Macullum et al. | Aug. 2, 1938 |
| 2,711,384 | Darley | June 21, 1955 |
| 2,806,067 | Monroe et al. | Sept. 10, 1957 |
| 2,921,882 | Leeds et al. | Jan. 19, 1960 |

OTHER REFERENCES

Chemical Abstracts 47: 12639h (1953).

March et al.: J. Econ. Entomology 45: 5, pp. 851–860, especially page 852, entry "Alcohols," October 1952.